US008427693B2

(12) United States Patent
Harada et al.

(10) Patent No.: US 8,427,693 B2
(45) Date of Patent: Apr. 23, 2013

(54) IMAGE PROCESSING APPARATUS AND METHOD

(75) Inventors: Hiroyuki Harada, Osaka (JP); Katsuji Furushige, Osaka (JP)

(73) Assignee: KYOCERA Document Solutions Inc. (JP)

( * ) Notice: Subject to any disclaimer, the term of this patent is extended or adjusted under 35 U.S.C. 154(b) by 625 days.

(21) Appl. No.: 12/700,452

(22) Filed: Feb. 4, 2010

(65) Prior Publication Data

US 2010/0245914 A1    Sep. 30, 2010

(30) Foreign Application Priority Data

| Mar. 24, 2009 | (JP) | ................................. 2009-072679 |
| Mar. 24, 2009 | (JP) | ................................. 2009-072680 |
| Mar. 24, 2009 | (JP) | ................................. 2009-072681 |

(51) Int. Cl.
*G06K 15/00* (2006.01)
*G06K 15/02* (2006.01)
*G06F 3/12* (2006.01)
*G06K 9/36* (2006.01)
*G06K 9/46* (2006.01)

(52) U.S. Cl.
USPC ....... 358/1.16; 358/1.15; 358/1.17; 358/1.13; 358/1.2; 382/235

(58) Field of Classification Search ........................ None
See application file for complete search history.

(56) References Cited

U.S. PATENT DOCUMENTS

| 6,219,156 B1 * | 4/2001 | Yoshida et al. | .......... 358/426.07 |
| 6,456,390 B1 * | 9/2002 | Okubo et al. | ................. 358/1.17 |
| 6,963,412 B1 * | 11/2005 | Toda | ............................ 358/1.13 |
| 2002/0003633 A1 | 1/2002 | Matsumoto et al. | |
| 2002/0085765 A1 * | 7/2002 | Brady | ........................... 382/239 |
| 2002/0093679 A1 * | 7/2002 | Brady | .......................... 358/1.15 |
| 2003/0231320 A1 * | 12/2003 | Tsunekawa | .................... 358/1.2 |
| 2006/0227369 A1 * | 10/2006 | Lin | ............................... 358/1.15 |
| 2008/0137141 A1 | 6/2008 | Hattori | |
| 2008/0266581 A1 * | 10/2008 | Ishikawa et al. | ............... 358/1.2 |
| 2009/0009821 A1 | 1/2009 | Machida | |
| 2009/0110311 A1 * | 4/2009 | Morita | ........................ 382/235 |
| 2012/0182583 A1 * | 7/2012 | Tao et al. | ..................... 358/1.16 |

FOREIGN PATENT DOCUMENTS

| JP | 10-222325 | 8/1998 |
| JP | 10-260804 | 9/1998 |
| JP | 2001-358929 | 12/2001 |
| JP | 2006-248184 | 9/2006 |
| JP | 2007-201705 | 8/2007 |
| JP | 2008-068547 | 3/2008 |
| JP | 2008-147856 | 6/2008 |
| JP | 2009-017297 | 1/2009 |

* cited by examiner

*Primary Examiner* — Satwant Singh
(74) *Attorney, Agent, or Firm* — McDonnell Boehnen Hulbert & Berghoff LLP

(57) ABSTRACT

Provided is an image processing apparatus configured as follows. A mode specification table in a storage device contains mode specification information obtained by associating a job designated by a user. The mode specification information indicates which of a page mode and a band mode is to be selected when the job is performed. An operation panel detects a first user operation for inputting the job and a second user operation for starting the job. A main controller, using the mode specification information, specifies the mode corresponding to the job designated by the first user operation. A main controller causes a data acquisition circuit to acquire image data upon detection of the second user operation and causes an image processing circuit to perform a data processing according to the specified mode.

14 Claims, 7 Drawing Sheets

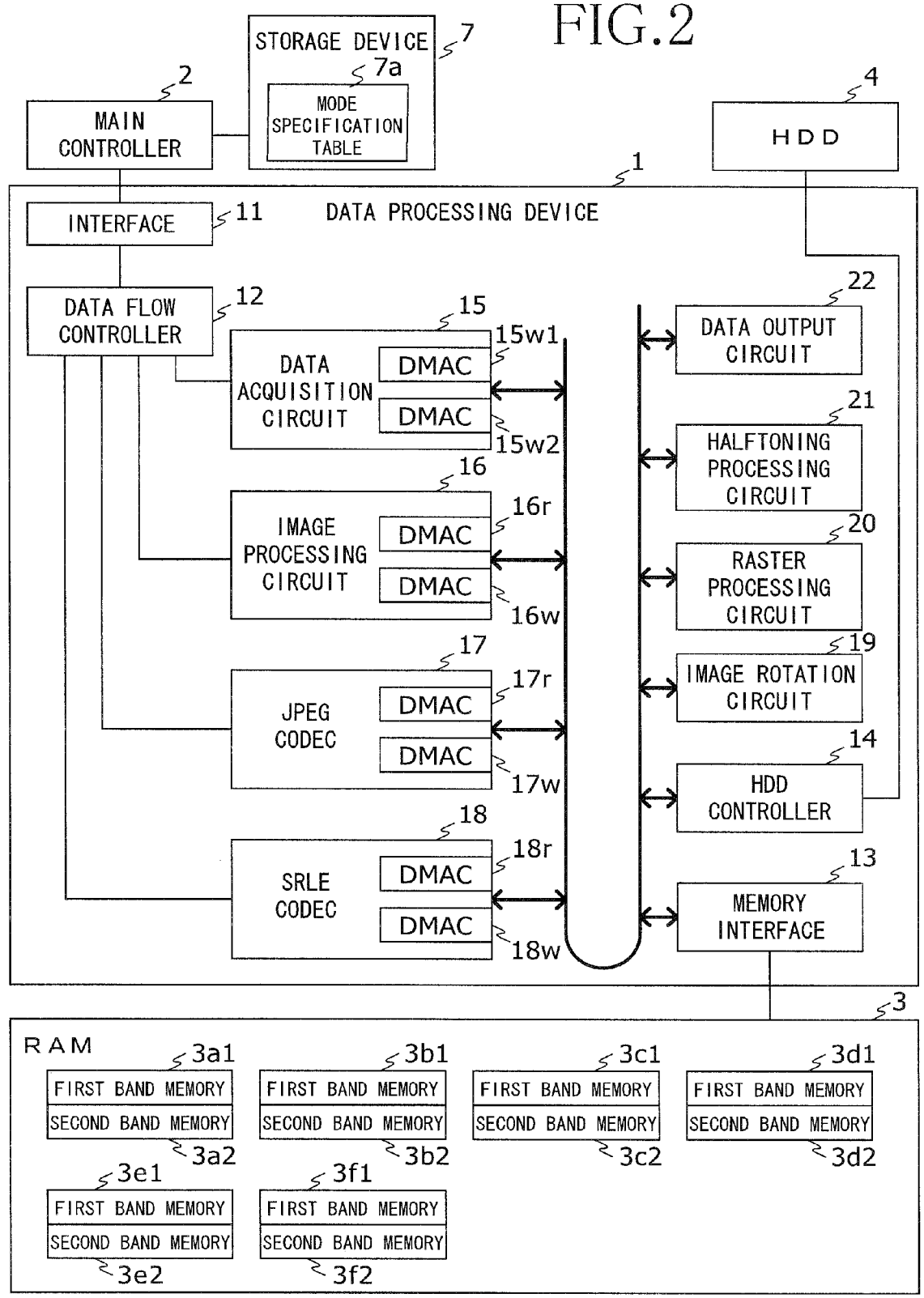

FIG.3

| JOB | | MODE |
|---|---|---|
| SINGLE-SIDED COPYING | | BAND MODE |
| SINGLE-SIDED REDUCTION COPYING | | |
| SINGLE-SIDED 180-DEGREE ROTATION COPYING | | |
| SINGLE-SIDED NETWORK TRANSMISSION | | |
| SINGLE-SIDED FACSIMILE TRANSMISSION | | |
| SINGLE-SIDED ENLARGEMENT COPYING | | PAGE MODE |
| SINGLE-SIDED MIXED SIZE COPYING | | |
| BOX STORING | | |
| 90-DEGREE OR 270-DEGREE ROTATION COPYING, NETWORK TRANSMISSION, FACSIMILE TRANSMISSION | | |
| DOUBLE-SIDED COPYING | FRONT SURFACE | BAND MODE |
| | BACK SURFACE | PAGE MODE |
| DOUBLE-SIDED NETWORK TRANSMISSION | FRONT SURFACE | BAND MODE |
| | BACK SURFACE | PAGE MODE |
| DOUBLE-SIDED FACSIMILE TRANSMISSION | FRONT SURFACE | BAND MODE |
| | BACK SURFACE | PAGE MODE |

…

IMAGE PROCESSING APPARATUS AND METHOD

INCORPORATION BY REFERENCE

This application is based upon and claims the benefit of priority from corresponding Japanese Patent Application Nos. 2009-072679, 2009-072680, and 2009-072681, all filed Mar. 24, 2009, the entire contents of which is incorporated herein by reference.

BACKGROUND OF THE INVENTION

1. Field of the Invention

The present invention relates to an image processing apparatus and method.

2. Description of the Related Art

On an image processing apparatus such as a printer, various kinds of data processing are performed on image data to be printed. In addition, data compression and decompression are performed on the image data. In those cases, either a page mode or a band mode is used. In the page mode, data processing is performed on image data stored on a page basis. The band mode is a mode of performing the data processing on the image data that is stored on a band data basis. Note that the band data is obtained by dividing one page of image data into a plurality of bands of image data.

On one image processing apparatus, the page mode or the band mode is selected based on a size of a page memory and a size of bitmap data obtained based on the image data.

However, on the above-described image processing apparatus, it is necessary to calculate the size of the bitmap data based on the image data when selecting the page mode or the band mode. Therefore, when the image data is supplied to the image processing apparatus, it is difficult to immediately start the data processing on that image data.

Alternatively, on another image processing apparatus, when a plurality of data processings are sequentially performed on band data, the band data is subjected to a given data processing, and then a data processing at the subsequent stage is performed on that band data. Therefore, the band data for which the data processing has been performed is stored in a memory, after which the band data is read from the memory in the data processing at the subsequent stage. In a case where the plurality of data processings are sequentially performed on the band data, the band data is temporarily stored in the memory, which requires a long period of time for writing and reading the band data.

Further, on the above-described image processing apparatus, an image rendering apparatus and a compressor/decompressor use one memory controller to perform writing and reading of data to and from an image memory, and hence a load thereon is likely to increase, and a period of time for the writing and reading tends to be longer.

SUMMARY OF THE INVENTION

The present invention relates to an image processing apparatus and method that are capable of starting a data processing corresponding to image data in one of a page mode and a band mode immediately when the image data is supplied, and are capable of reducing a period of time for writing and reading band data to and from a memory when a plurality of data processings are sequentially performed on the band data.

An image processing apparatus according to one aspect of the present invention comprises a storage device, a data processing device, an input device, and a main controller. The storage device is configured to store mode specification information associating a job with a mode, which indicates whether a page mode or a band mode is to be selected when the job is performed. The data processing device is configured to acquire image data and perform a data processing on the image data. The input device is configured to detect a first user operation for inputting the job and a second user operation for starting the job. The main controller is configured to specify the mode corresponding to the job designated by the first user operation, and cause the data processing device to acquire the image data upon detection of the second user operation and to perform the data processing by the specified mode.

Further, the image processing apparatus according to another aspect of the present invention further comprises a data storage device and a memory. The data storage device is configured to store the image data corresponding to one page. The memory is configured to store band data obtained by dividing the image data corresponding to one page. When the specified mode is the band mode, the image data is stored in the memory as the band data. When the identified mode is the page mode, the image data is stored in the data storage device. The data processing device is further configured to perform the data processing on the band data read from the memory when the specified mode is the band mode, and on the image data read from the data storage device when the specified mode is the page mode.

Further, in the image processing apparatus according to the yet another aspect of the present invention, the data processing device comprises a plurality of processing circuits, a data flow controller, a memory, and an input direct memory access controller. The memory includes a first band memory and a second band memory. Each of the plurality of processing circuits comprises an output direct memory access controller (output DMAC) that performs direct memory access for writing data to the first band memory and the second band memory and an input direct memory access controller (input DMAC) that performs direct memory access for reading data from the first band memory and the second band memory. The data flow controller is configured to cause the output DMAC to alternately write given band data to either the first band memory or the second band memory. In parallel therewith, when the specified mode is the band mode, the data flow controller causes the input DMAC to read the band data that immediately precedes the given band data from the other one of the first band memory and the second band memory.

Further, according to an aspect of the present invention, an image processing method of processing band data obtained by dividing image data corresponding to one page, using a first band memory and a second band memory as band data areas is provided. The method comprises an output direct memory access control (output DMAC) step of alternately writing the band data to one of the first band memory and the second band memory and an input direct memory access control (input DMAC) step of reading the band data that immediately precedes the band data from another one of the first band memory and the second band memory in parallel with the output DMAC step.

Additional features and advantages are described herein, and will be apparent from the following Detailed Description and the figures.

BRIEF DESCRIPTION OF THE FIGURES

In the accompanying drawings:

FIG. 2 is a block diagram illustrating a configuration of a data processing device of FIG. 1;

FIG. 3 illustrates an example of a mode specification table of FIG. 1;

DETAILED DESCRIPTION

Figure 1:
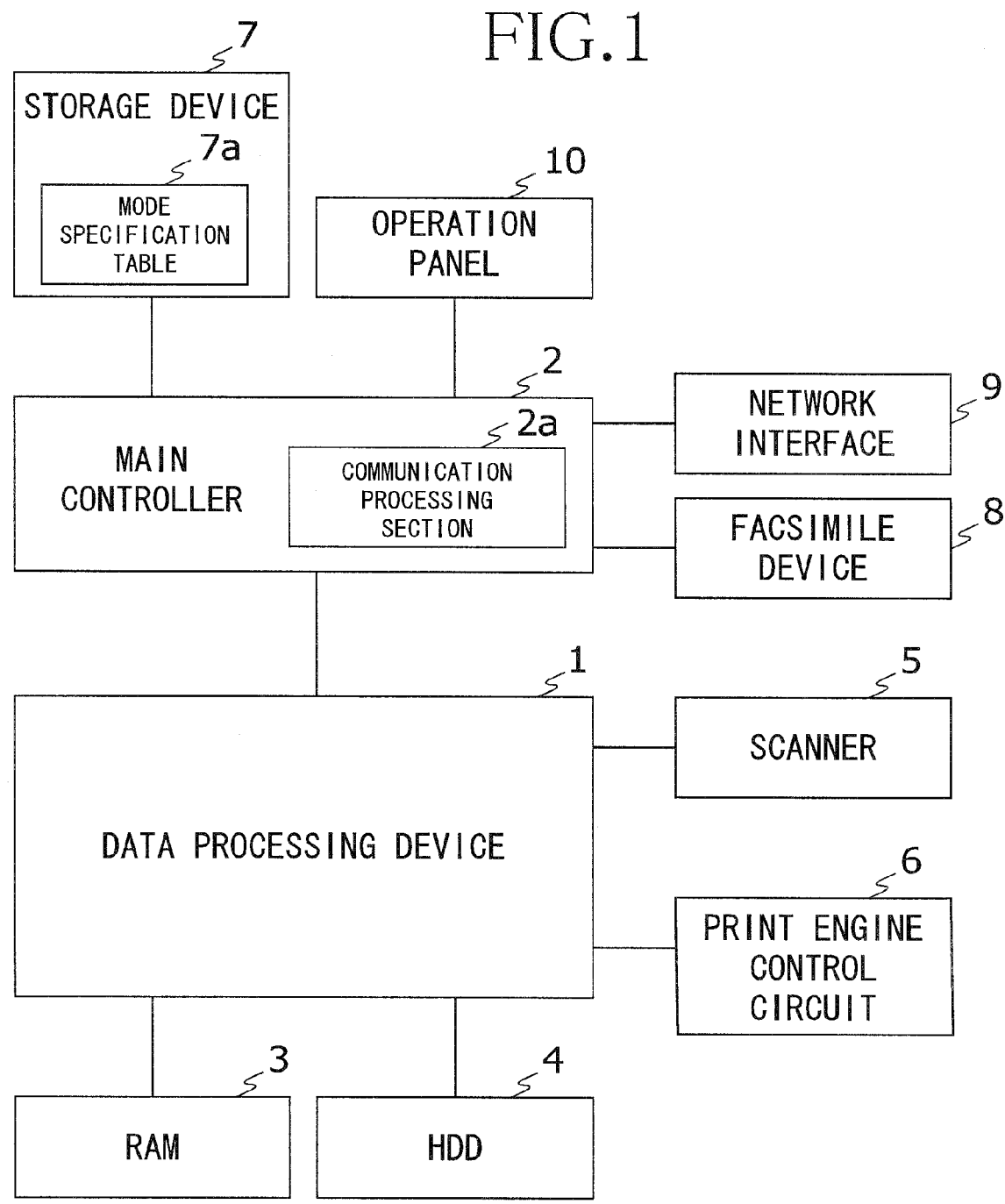
FIG. 1 is a block diagram illustrating a configuration of an image processing apparatus according to an embodiment of the present invention.

FIG. 1 is a block diagram illustrating a configuration of an image processing apparatus according to an embodiment of the present invention. FIG. 2 is a block diagram illustrating a configuration of a data processing device 1 of FIG. 1.

The image processing apparatus illustrated in FIG. 1 includes the data processing device 1, a main controller 2, a random access memory (RAM) 3, a hard disk drive (HDD) 4, a scanner 5, a print engine control circuit 6, a storage device 7, a facsimile device 8, a network interface 9, an operation panel 10, and a print engine (not illustrated) that performs printing on a paper sheet.

The data processing device 1 processes the image data received from the scanner 5 or the like, on a band basis or a page basis, and outputs the image data to the main controller 2, the HDD 4, the print engine control circuit 6, or the like. Note that image data and attribute data corresponding to the image data are output from the scanner 5, and hence the data processing device 1 performs a predetermined processing on both the image data and the attribute data. The attribute data is used for making settings for color processing, gradation processing, etc. The attribute data include pixel information representing, for example, whether or not the pixel is part of a character. Further, the image data and the attribute data are handled as page data on a page basis or as band data corresponding to one of a plurality of bands into which one page is divided. For example, the image data has four planes in cyan/magenta/yellow/black (CMYK), and the attribute data has an A-plane and an S-plane. Each of the planes in CMYK is a plane having a height of 8 bits. Further, the A-plane is a plane having a height of 4 bits, while the S-plane is a plane having a height of 8 bits.

The main controller 2 is a circuit that supplies commands to the data processing device 1, which is configured to control the scanner 5, the facsimile device 8, and the network interface 9, based on a user operation performed on the operation panel 10. The main controller 2 references a mode specification table 7a of the storage device 7 to specify a mode corresponding to a job designated by the user operation. The main controller 2 is a control circuit that causes the data processing device 1 to acquire image data upon detection of the user operation and causes the data processing device 1 to perform the data processing in accordance with the specified mode.

The main controller 2, which is a computer including a central processing unit (CPU), a read only memory (ROM), and a RAM, outputs a command through a program stored in the ROM or the like, and performs data processing.

The main controller 2 controls the facsimile device 8 and the network interface 9, and includes a communication processing section 2a that performs data processing on transmission data.

The RAM 3 is a memory that temporarily stores the band data from the processing performed by the data processing device 1. Used as the RAM 3 is, for example, one or a plurality of dynamic RAMs (DRAMs).

A memory area of the RAM 3 is used for first band memories and second band memories that respectively form pairs, that is, band memories 3a1 and 3a2, band memories 3b1 and 3b2, band memories 3c1 and 3c2, band memories 3d1 and 3d2, band memories 3e1 and 3e2, and band memories 3f1 and 3f2. Each of the band memories has a band data area of a size capable of storing each respective band data.

The band memories 3a1, 3a2, 3b1, and 3b2 are used for supplying the band data from a data acquisition circuit 15 to an image processing circuit 16. In particular, the band memories 3a1 and 3a2 are used for the band data of the image data (hereinafter, referred to as "image band data"), while the band memories 3b1 and 3b2 are used for the band data of the attribute data (hereinafter, referred to as "attribute band data"). Note that in a case where a plurality of planes exist, two band memories are previously secured for each of the planes.

The band memories 3c1, 3c2, 3d1, and 3d2 are used for supplying the band data from the image processing circuit 16 to a joint photographic experts group (JPEG) codec 17 and a switched run length encoding (SRLE) codec 18. In particular, the band memories 3c1 and 3c2 are used for the image band data, while the band memories 3d1 and 3d2 are used for the attribute band data. Note that in a case where a plurality of planes exist, two band memories are previously secured for each of the planes.

The band memories 3e1, 3e2, 3f1, and 3f2 are used for supplying the band data from a data acquisition circuit 15 to the JPEG codec 17 and the SRLE codec 18. In particular, the band memories 3e1 and 3e2 are used for the image band data, while the band memories 3f1 and 3f2 are used for the attribute band data. Note that in a case where a plurality of planes exist, two band memories are previously secured for each of the planes.

The HDD 4 is a data storage device that stores the page data formed from the band data corresponding to one page. The HDD 4 is larger in capacity and lower in speed than the RAM 3. In this embodiment, the compressed band data for every page is stored in the HDD 4.

The scanner 5 optically reads an image of an original on one side or both sides thereof, and outputs the image data and the attribute data obtained by reading the image. The scanner 5 sequentially outputs the image data and the attribute data generated by the reading of the image, as the band data.

The print engine control circuit 6 supplies print image data to the print engine, and controls the print engine to execute printing thereof.

The storage device 7 stores data and a program to be used by the main controller 2. The storage device 7 is a nonvolatile memory such as a ROM and a flash memory, an HDD, or the like. The storage device 7 pre-stores a mode specification table 7a.

The mode specification table 7a includes mode specification information obtained by associating the job designated by a user with the mode. The mode indicates which of the page mode and the band mode is to be selected when the designated job is performed. In the page mode, on the data processing device 1, the image data is stored in the HDD 4 on a page basis at a stage preceding the image processing circuit 16. In the band mode, on the data processing device 1, when transferring the image data from the data acquisition circuit 15 to the image processing circuit 16, the image data is stored in the RAM 3 on a band basis. FIG. 3 illustrates an example of the mode specification table of FIG. 1.

The facsimile device 8 transmits facsimile data generated from image data and generates image data from facsimile data it receives.

The network interface 9 is a communication device that is connected to a network. It performs data communications with a terminal device via the network.

The operation panel 10 includes a display device that displays various kinds of information and an input device that detects user operations and outputs electrical signals corresponding to the respective user operations. Examples of the display device include a liquid crystal display, and examples of the input device include a touch panel and a key switch. The input device of the operation panel 10 detects a first user operation for inputting the job and a second user operation for starting the job.

FIG. 2 sets forth the configuration of the data processing device 1.

The data processing device 1 includes an interface 11, a data flow controller 12, a memory interface 13, an HDD controller 14, the data acquisition circuit 15, the image processing circuit 16, the JPEG codec 17, the SRLE codec 18, an image rotation circuit 19, a raster processing circuit 20, a halftoning processing circuit 21, and a data output circuit 22.

The interface 11 transmits and receives data and commands between the main controller 2 and the data flow controller 12.

Upon receiving a command from the main controller 2, the data flow controller 12 controls corresponding direct memory access controllers (DMACs) to cause the data acquisition circuit 15, the image processing circuit 16, the JPEG codec 17, and the SRLE codec 18 to operate. The data flow controller 12 causes an output DMAC of one of the plurality of processing circuits to write given band data to one of the first band memory and the second band memory. In parallel therewith, the data flow controller 12 causes an input DMAC of the processing circuit at the stage subsequent to the given processing circuit to read the band data that immediately precedes the given band data from the other one of the first band memory and the second band memory.

The memory interface 13 is a circuit that transmits and receives data and commands between the RAM 3 and an internal signal line. The internal signal line connects the memory interface 13, the HDD controller 14, the data acquisition circuit 15, the image processing circuit 16, the JPEG codec 17, the SRLE codec 18, the image rotation circuit 19, the raster processing circuit 20, the halftoning processing circuit 21, and the data output circuit 22 to one another. Transmission/reception of an address and data is performed via the signal line.

The HDD controller 14 reads data from and writes data to the HDD 4.

The data acquisition circuit 15 sequentially acquires the image data and the attribute data from the scanner 5 as the band data, and stores the image data and the attribute data in the RAM 3. The data acquisition circuit 15 includes output DMACs 15$w$1 and 15$w$2. The output DMAC 15$w$1 of the data acquisition circuit 15 writes the image band data alternately to the band memories 3$a$1 and 3$a$2, and writes the attribute band data alternately to the band memories 3$b$1 and 3$b$2. The output DMAC 15$w$2 of the data acquisition circuit 15 writes the image band data alternately to the band memories 3$e$1 and 3$e$2, and writes the attribute band data alternately to the band memories 3$f$1 and 3$f$2.

The image processing circuit 16 reads the image band data and the attribute band data from the RAM 3, executes predetermined processing (such as image enlargement processing, image reduction processing, image 180-degree rotation processing, or color conversion processing) on the band data thereon, and stores the processed band data into the RAM 3. The image processing circuit 16 includes an input DMAC 16$r$ and an output DMAC 16$w$. The input DMAC 16$r$ of the image processing circuit 16 reads the image band data alternately from the band memories 3$a$1 and 3$a$2 or from the band memories 3$e$1 and 3$e$2, and reads the attribute band data alternately from the band memories 3$b$1 and 3$b$2 or from the band memories 3$f$1 and 3$f$2. The output DMAC 16$w$ of the image processing circuit 16 writes the image band data processed in the image processing circuit 16 alternately to the band memories 3$c$1 and 3$c$2, and writes the attribute band data processed in the image processing circuit 16 alternately to the band memories 3$d$1 and 3$d$2.

The JPEG codec 17 (serving as an example of a data compression/decompression circuit) reads the image band data stored in the RAM 3, compresses the band data by encoding the band data in JPEG format, and stores the band data into the HDD 4. Then, the JPEG codec 17 reads the band data from the page data of the image data stored in the HDD 4, decompresses the band data by decoding the band data in JPEG format, and stores the band data into the RAM 3. The JPEG codec 17 includes an input DMAC 17$r$ and an output DMAC 17$w$. In the encoding, the input DMAC 17$r$ of the JPEG codec 17 reads the band data alternately from the band memories 3$c$1 and 3$c$2 or from the band memories 3$e$1 and 3$e$2. Then, the output DMAC 17$w$ of the JPEG codec 17 writes the band data compressed in JPEG format to the HDD 4 through the HDD controller 14. In the decoding, the input DMAC 17$r$ reads the band data compressed in JPEG format from the HDD 4 through the HDD controller 14. Then, the output DMAC 17$w$ writes the band data alternately to the band memories 3$e$1 and 3$e$2.

The SRLE codec 18 (serving as an example of a data compression/decompression circuit) reads the attribute band data stored in the RAM 3, compresses the band data by encoding the band data in SRLE format, and stores the band data into the HDD 4. Then, the SRLE codec 18 reads the band data from the page data on the image data stored in the HDD 4, decompresses the band data by decoding the band data in SRLE format, and stores the band data into the RAM 3. The SRLE codec 18 includes an input DMAC 18$r$ and an output DMAC 18$w$. In the encoding, the input DMAC 18$r$ of the SRLE codec 18 reads the band data alternately from the band memories 3$d$1 and 3$d$2 or from the band memories 3$f$1 and 3$f$2. Then, the output DMAC 18$w$ of the SRLE codec 18 writes the band data compressed in SRLE format to the HDD 4 through the HDD controller 14. In the decoding, the input DMAC 18$r$ reads the band data compressed in SRLE format from the HDD 4 through the HDD controller 14. Then, the output DMAC 18$w$ writes the band data alternately to the band memories 3$f$1 and 3$f$2.

The image rotation circuit 19 generates image data corresponding to one page rotated by 90 degrees or 270 degrees.

The raster processing circuit 20 reads the image band data and the attribute band data from the RAM 3, executes rasterization on the band data thereon, and generates raster data. The raster data is compressed by the SRLE codec 18 on a band basis, and is then stored into the HDD 4. After that, the compressed raster data is read and decompressed by the SRLE codec 18 on a band basis, and the raster data is stored into the RAM 3.

The halftoning processing circuit 21 reads the raster data from the RAM 3 on a band basis, executes halftoning processing, and stores the data from the halftoning process into the RAM 3.

The data output circuit 22 supplies the communication processing section 2a with the band data that has been read from the HDD 4 and decompressed by the JPEG codec 17 and the SRLE codec 18, or reads the data on which the halftoning processing has been performed from the RAM 3 to supply the print engine control circuit 6 therewith.

Note that the interface 11, the data flow controller 12, the memory interface 13, the HDD controller 14, the data acquisition circuit 15, the image processing circuit 16, the JPEG codec 17, the SRLE codec 18, the image rotation circuit 19, the raster processing circuit 20, the halftoning processing circuit 21, and the data output circuit 22 are each implemented as an application specific integrated circuit (ASIC).

Next described is an operation of the above-described image processing apparatus.

By operating the input device of the operation panel 10, the user performs the first user operation to designate the job and the second user operation to cause the image processing apparatus to execute the designated job. The first user operation is an operation that is performed with respect to a touch panel of the operation panel 10 in order to, for example, select the job from a menu. The second user operation is, for example, depression of a start button performed on the operation panel 10.

The main controller 2 references the mode specification table 7a of the storage device 7 to specify the mode corresponding to the job designated by the first user operation. And upon detection of the second user operation, the main controller 2 causes the data processing device 1 to acquire the image data and to perform data processing according to the specified mode (band mode or page mode).

First, description is made of an operation of the data processing device 1 in the band mode.

Figure 4:
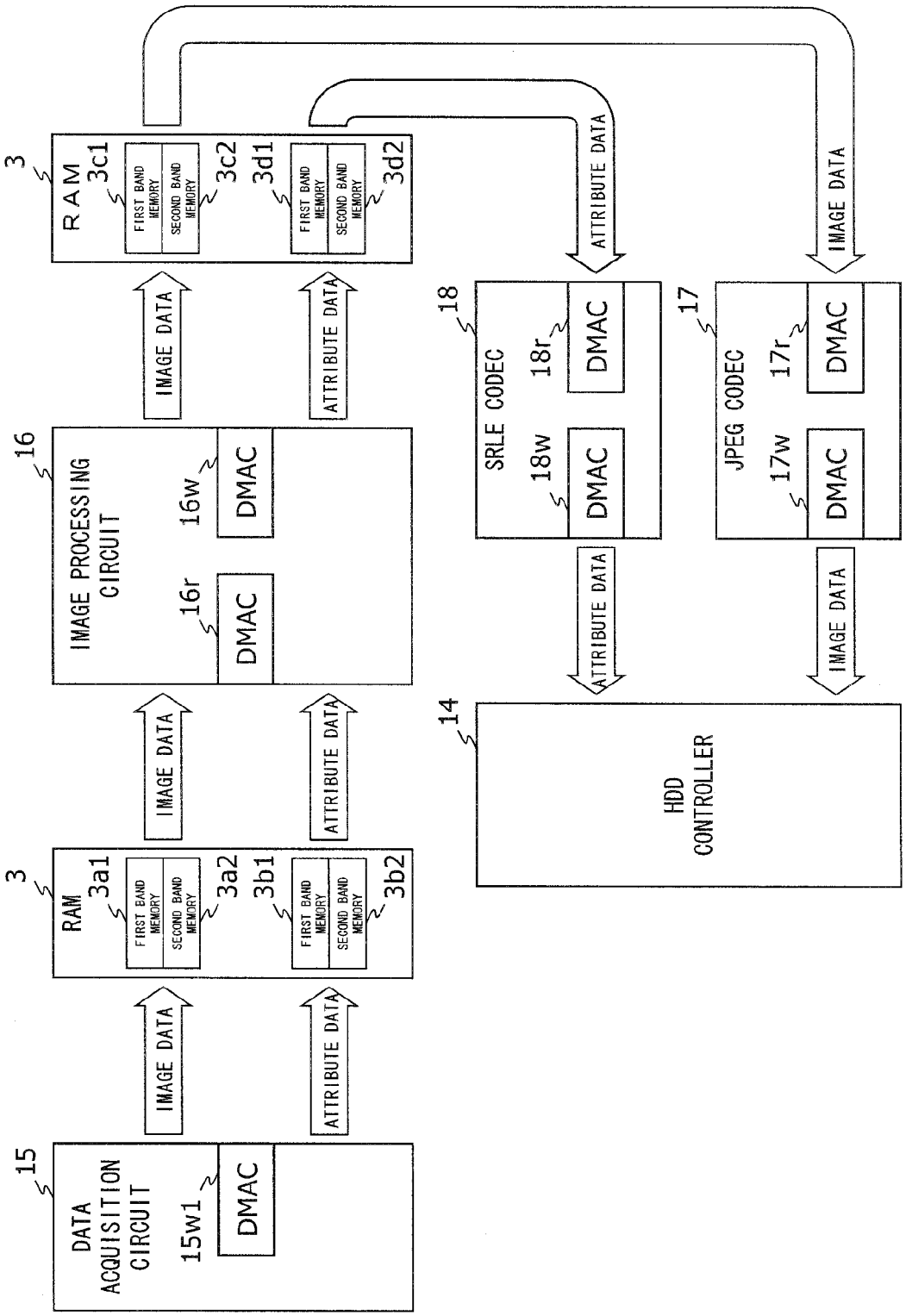
FIG. 4 is a diagram illustrating a data flow in a band mode on the image processing apparatus of FIG. 1.
Figure 5:
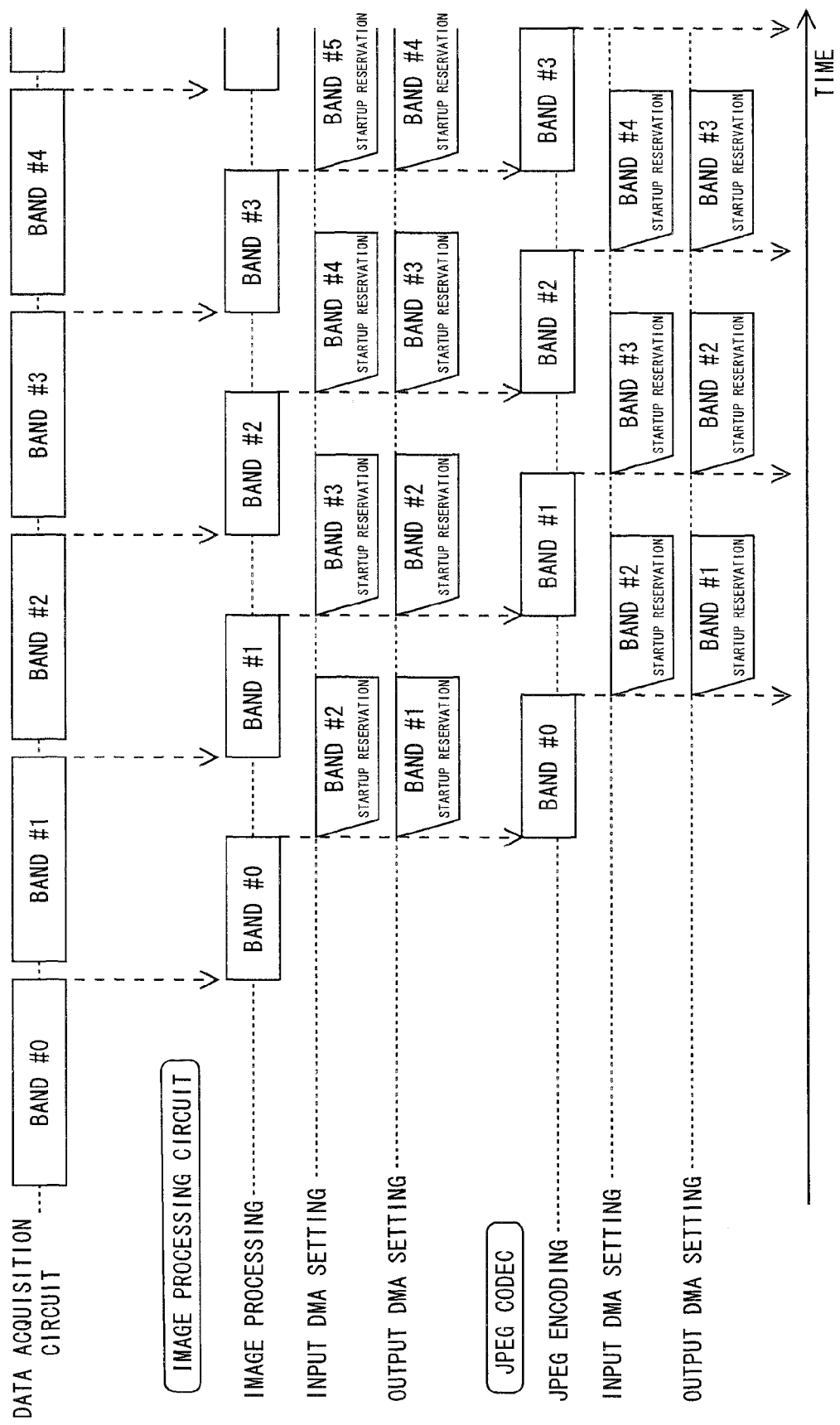
FIG. 5 is a timing chart illustrating processing performed on a plurality of processing circuits in the band mode on the image processing apparatus of FIG. 1.

FIG. 4 is a diagram illustrating a data flow in the band mode on the image processing apparatus of FIG. 1. FIG. 5 is a timing chart illustrating processing performed on the plurality of processing circuits in the band mode on the image processing apparatus illustrated of FIG. 1.

The main controller 2 causes the scanner 5 to start image reading, and supplies a command to the data flow controller 12 in order to cause the processing of the specified job to be executed on the image data and the attribute data generated by the scanner 5.

Upon receiving the command, the data flow controller 12 causes the data acquisition circuit 15, the image processing circuit 16, the JPEG codec 17, and the SRLE codec 18 to operate as follows.

The data acquisition circuit 15 sequentially acquires the image band data and the attribute band data, and the output DMAC 15w1 writes the image band data to one of the band memories 3a1 and 3a2, and writes the attribute band data to one of the band memories 3b1 and 3b2.

The image band data on a band #0 is written to the band memory 3a1, and then the attribute band data on the band #0 is written to the band memory 3b1.

By an interrupt or the like, the image processing circuit 16 is notified by the data flow controller 12 that the writing of the image band data and the attribute band data on the band #0 by the data acquisition circuit 15 has been completed. The input DMAC 16r of the image processing circuit 16 reads the image band data and the attribute band data on the band #0 from the band memories 3a1 and 3b1, respectively. The output DMAC 16w writes the image band data and the attribute band data on the band #0 (for which the data processing has been performed), to the band memories 3c1 and 3d1, respectively. At this time, the input DMAC 16r and the output DMAC 16w operate in parallel with each other.

Meanwhile, after the writing of the image band data and the attribute band data on the band #0 is completed, the output DMAC 15w1 of the data acquisition circuit 15 writes the image band data and the attribute band data on the band #1 to the band memories 3a2 and 3b2, respectively.

At this time, the writing to the band memories 3a2 and 3b2 by the output DMAC 15w1 and the reading from the band memories 3a1 and 3b1 by the input DMAC 16r are performed in parallel with each other.

The processing by the image processing circuit 16 and the writing thereby of the image band data and the attribute band data on the band #0 to the band memories 3c1 and 3d1, respectively, are completed. The startup of the input DMAC 16r is reserved for the reading of the band data on a band #2 from the band memories 3a1 and 3b1. At the same time, the startup of the output DMAC 16w is reserved for the writing of the band data on the band #1 to the band memories 3c2 and 3d2. Note that the startup reservation for the reading of the band data on the bands #0 and #1 and the startup reservation for the writing of the band data on the band #0 are previously performed at the startup of the data acquisition circuit 15. After that, the startup reservation is performed in the same manner.

Then, by an interrupt or the like, the JPEG codec 17 and the SRLE codec 18 are notified by the data flow controller 12 that the processing by the image processing circuit 16 and the writing thereby of the image band data and the attribute band data to the band memories 3c1 and 3d1, respectively, have been completed. The input DMAC 17r of the JPEG codec 17 reads the image band data on the band #0 from the band memory 3c1. The output DMAC 17w writes the image band data that has been compressed in JPEG format to the HDD 4 through the HDD controller 14. The input DMAC 18r of the SRLE codec 18 reads the attribute band data on the band #0 from the band memory 3d1. The output DMAC 18w writes the attribute band data that has been compressed in SRLE format to the HDD 4 through the HDD controller 14. At this time, the input DMAC 17r and the output DMAC 17w operate in parallel with each other. The input DMAC 18r and the output DMAC 18w also operate in parallel with each other.

The processing on the band #0 by the JPEG codec 17 is completed. The startup of the input DMAC 17r and 18r are reserved for the reading of the band data on the band #2 from the band memories 3c1 and 3d1. At the same time, the startup of the output DMAC 17w is reserved for the writing of the band data on the band #1. Note that the startup reservation for the reading of the band data on the bands #0 and #1 and the startup reservation for the writing of the band data on the band #0 are previously performed at the startup of the data acquisition circuit 15. After that, the startup reservation is performed in the same manner. Note that the startup reservation is performed also at the SRLE codec 18 in the same manner.

Further, by an interrupt or the like, the image processing circuit 16 is notified by the data flow controller 12 that the writing of the image band data and the attribute band data on the band #1 by the data acquisition circuit 15 has been completed. The input DMAC 16r of the image processing circuit 16 reads the image band data and the attribute band data on the band #1 from the band memories 3a2 and 3b2, respectively. The output DMAC 16w writes the image band data and the attribute band data on the band #1 (for which the data processing has been performed) to the band memories 3c2 and 3d2, respectively.

At this time, the writing to the band memories $3c2$ and $3d2$ by the output DMAC $16w$ and the reading from the band memories $3c1$ and $3d1$ by the input DMACs $17r$ and $18r$ are performed in parallel with each other.

Meanwhile, after the writing of the image band data and the attribute band data on the band #1 is completed, the output DMAC $15w1$ of the data acquisition circuit 15 writes the image band data and the attribute band data on the band #2 to the band memories $3a1$ and $3b1$, respectively. At this time, the data acquisition circuit 15 overwrites the image band data and the attribute band data from the band #0 in the band memories $3a1$ and $3b1$, respectively, with the image band data and the attribute band data from the band #2. A data processing time for the one band data at the image processing circuit 16 is set to be shorter than the data processing time for the one band data at the data acquisition circuit 15. As a result, the image processing circuit 16 has already completed the processing for the band #0 before the data acquisition circuit 15 is ready to write, which prevents any problems due to the data overwriting.

At this time, the writing to the band memories $3a1$ and $3b1$ by the output DMAC $15w1$ and the reading from the band memories $3a2$ and $3b2$ by the input DMACs $16r$ are performed in parallel with each other.

Then, by an interrupt or the like, the JPEG codec 17 and the SRLE codec 18 are notified by the data flow controller 12 that the processing by the image processing circuit 16 and the writing thereby of the image band data and the attribute band data to the band memories $3c2$ and $3d2$, respectively, have been completed. The input DMAC $17r$ of the JPEG codec 17 reads the image band data on the band #1 from the band memory $3c2$. The output DMAC $17w$ writes the image band data that has been compressed in JPEG format to the HDD 4 through the HDD controller 14. The input DMAC $18r$ of the SRLE codec 18 reads the attribute band data on the band #1 from the band memory $3d2$. The output DMAC $18w$ writes the attribute band data that has been compressed in SRLE format to the HDD 4 through the HDD controller 14.

Further, by an interrupt or the like, the image processing circuit 16 is notified by the data flow controller 12 that the writing of the image band data and the attribute band data on the band #2 by the data acquisition circuit 15 has been completed. The input DMAC $16r$ of the image processing circuit 16 reads the image band data and the attribute band data on the band #2 from the band memories $3a1$ and $3b1$, respectively. The output DMAC $16w$ writes the image band data and the attribute band data on the band #2 (for which the data processing has been performed) to the band memories $3c1$ and $3d1$, respectively. At this time, the output DMAC $16w$ of the image processing circuit 16 overwrites the image band data and the attribute band data on the band #0 in the band memories $3c1$ and $3d1$, respectively, with the image band data and the attribute band data on the band #2. Data processing times for one band data at the JPEG codec 17 and the SRLE codec 18 are set to be shorter than the data processing time for one band data at the image processing circuit 16. The JPEG codec 17 and the SRLE codec 18 have already completed the processing for the band #0 by the time the image processing circuit 16 is ready to write, which prevents any problems caused by the data overwriting.

As described above, each of the processing circuits 15 to 18 has a data processing time for one band data that is set to be shorter than that of the processing circuit preceding it. For example, the data acquisition circuit 15 processes one band data in 25 milliseconds, the image processing circuit 16 processes one band data in 10 milliseconds, and the JPEG codec 17 and the SRLE codec 18 process one band data in 5 milliseconds.

At this time, the writing to the band memories $3c1$ and $3d1$ by the output DMAC $16w$ and the reading from the band memories $3c2$ and $3d2$ by the input DMACs $17r$ and $18r$ are performed in parallel with each other.

Meanwhile, after the writing of the image band data and the attribute band data on the band #2 is completed, the output DMAC $15w1$ of the data acquisition circuit 15 writes the image band data and the attribute band data on the band #3 to the band memories $3a2$ and $3b2$, respectively. At this time, the data acquisition circuit 15 overwrites the image band data and the attribute band data on the band #1 in the band memories $3a2$ and $3b2$, respectively, with the image band data and the attribute band data on the band #3.

At this time, the writing to the band memories $3a2$ and $3b2$ by the output DMAC $15w1$ and the reading from the band memories $3a1$ and $3b1$ by the input DMAC $16r$ are performed in parallel with each other.

Then, by an interrupt or the like, the JPEG codec 17 and the SRLE codec 18 are notified by the data flow controller 12 that the processing by the image processing circuit 16 and the writing thereby of the image band data and the attribute band data to the band memories $3c1$ and $3d1$, respectively, have been completed. The input DMAC $17r$ of the JPEG codec 17 reads the image band data on the band #2 from the band memory $3c1$. The output DMAC $17w$ writes the image band data that has been compressed in JPEG format to the HDD 4 by the HDD controller 14. The input DMAC $18r$ of the SRLE codec 18 reads the attribute band data on the band #2 from the band memory $3d1$. The output DMAC $18w$ writes the attribute band data that has been compressed in SRLE format to the HDD 4 through the HDD controller 14.

After that, the band data on the band #3 and subsequent bands are processed in the same manner. Accordingly, the band data corresponding to one page are sequentially subjected to pipeline processing by the data acquisition circuit 15, the image processing circuit 16, the JPEG codec 17, and the SRLE codec 18, and the processed data is stored to the HDD 4.

When the job designated by the user is copying, after the data corresponding to one page is thus stored in the HDD 4, the rasterization by the raster processing circuit 20 and the halftoning processing by the halftoning processing circuit 21 are performed to generate print image data from the data corresponding to one page. The print image data is supplied to the print engine control circuit 6 by the data output circuit 22, and printing is executed.

Further, when the job designated by the user is network transmission, after the data corresponding to one page is stored to the HDD 4, the data is decoded by the JPEG codec 17 and the SRLE codec 18 and supplied to the communication processing section $2a$ by the data output circuit 22. Generated from the data by the communication processing section $2a$ is a data file having a predetermined file format (for example, PDF format). The data file is transmitted through the network interface 9 to a predetermined terminal device according to a predetermined protocol (such as file sharing or electronic mail).

Further, when the job designated by the user is facsimile transmission, after the data corresponding to one page is stored to the HDD 4, the data is decoded by the JPEG codec 17 and the SRLE codec 18 and supplied to the communication processing section $2a$ by the data output circuit 22. Facsimile data is generated from the data by the communication processing section 2a. Through the facsimile device 8, the facsimile data is transmitted to a facsimile number designated by the user.

Next, description is made of an operation of the data processing device 1 in the page mode.

Figure 6:
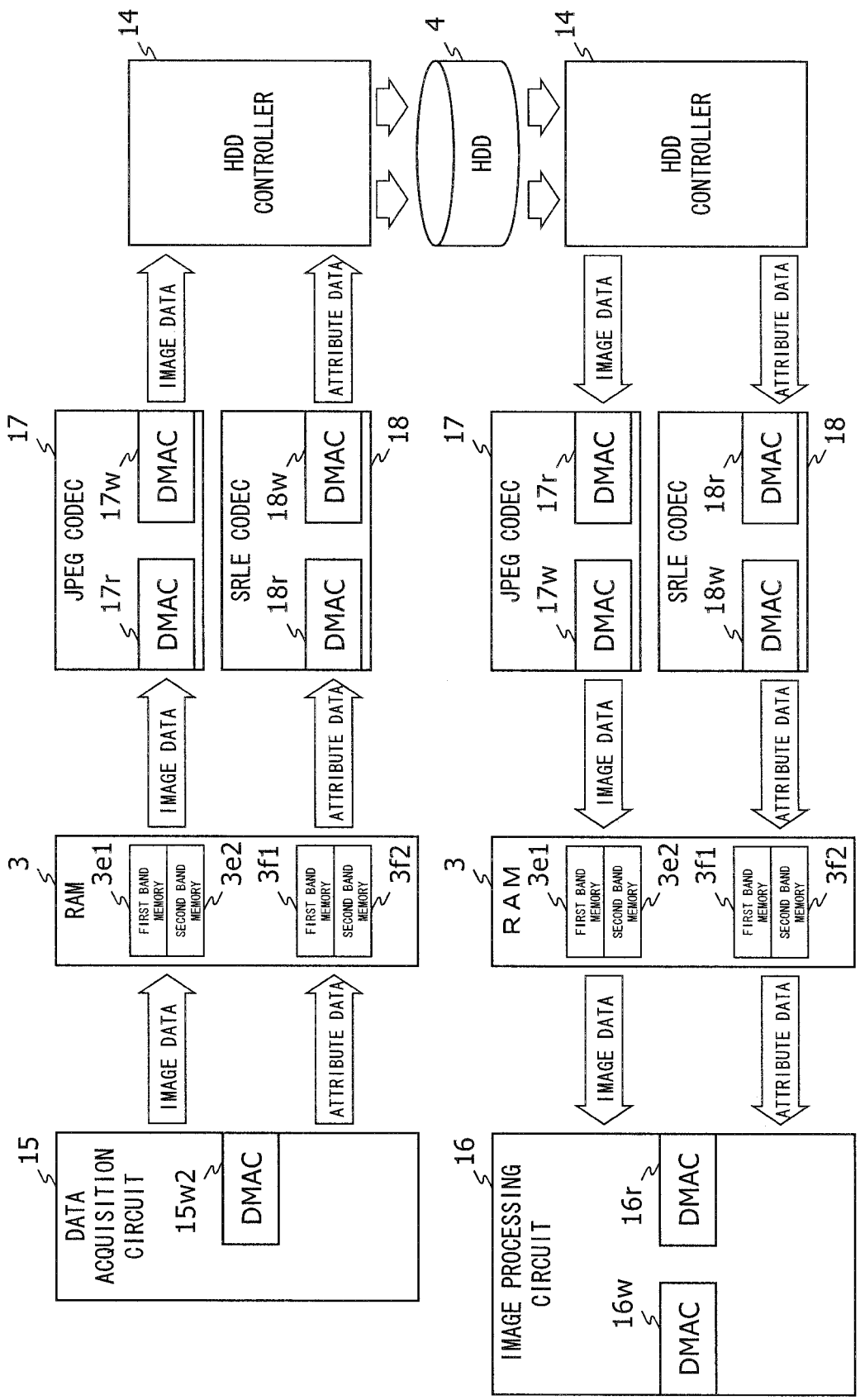
FIG. 6 is a diagram illustrating a data flow in a page mode on the image processing apparatus of FIG. 1.

FIG. 6 is a diagram illustrating a data flow in the page mode on the image processing apparatus illustrated in FIG. 1.

First, the main controller 2 causes the scanner 5 to start image reading, and supplies a command to the data flow controller 12 in order to cause the processing of the specified job to be executed on the image data and the attribute data generated by the scanner 5.

Upon reception of the command, the data flow controller 12 causes the data acquisition circuit 15, the image processing circuit 16, the JPEG codec 17, and the SRLE codec 18 to operate as follows.

The data acquisition circuit 15 sequentially acquires the image band data and the attribute band data. The output DMAC 15w2 writes the image band data to one of the band memories 3e1 and 3e2, and writes the attribute band data to one of the band memories 3f1 and 3f2.

The image band data on the band #0 is written to the band memory 3e1, and then the attribute band data on the band #0 is written to the band memory 3f1.

Subsequently, by an interrupt or the like, the JPEG codec 17 and the SRLE codec 18 are notified by the data flow controller 12 that the writing of the image band data and the attribute band data, respectively, on the band #0 by the data acquisition circuit 15 has been completed. The input DMAC 17r of the JPEG codec 17 reads the image band data on the band #0 from the band memory 3e1. The output DMAC 17w writes the image band data that has been compressed in JPEG format to the HDD 4 through the HDD controller 14. The input DMAC 18r of the SRLE codec 18 reads the attribute band data on the band #0 from the band memory 3f1. The output DMAC 18w writes the image band data that has been compressed in SRLE format to the HDD 4 through the HDD controller 14. At this time, the input DMAC 17r and the output DMAC 17w operate in parallel with each other, and the input DMAC 18r and the output DMAC 18w operate in parallel with each other.

Meanwhile, after the writing of the image band data and the attribute band data on the band #0 is completed, the output DMAC 15w1 of the data acquisition circuit 15 writes the image band data and the attribute band data on the band #1 to the band memories 3e2 and 3f2, respectively.

At this time, the writing to the band memories 3e2 and 3f2 by the output DMAC 15w1 and the reading from the band memories 3e1 and 3f1 by the input DMACs 17r and 18r are performed in parallel with each other.

Subsequently, by an interrupt or the like, the JPEG codec 17 and the SRLE codec 18 are notified by the data flow controller 12 that the writing of the image band data and the attribute band data, respectively, on the band #1 by the data acquisition circuit 15 has been completed. The input DMAC 17r of the JPEG codec 17 reads the image band data on the band #1 from the band memory 3e2. The output DMAC 17w writes the image band data that has been compressed in JPEG format to the HDD 4 through the HDD controller 14. The input DMAC 18r of the SRLE codec 18 reads the attribute band data on the band #1 from the band memory 3f2. The output DMAC 18w writes the image band data that has been compressed in SRLE format to the HDD 4 through the HDD controller 14.

Meanwhile, after the writing of the image band data and the attribute band data on the band #1 is completed, the output DMAC 15w1 of the data acquisition circuit 15 writes the image band data and the attribute band data on the band #2 to the band memories 3e1 and 3f1, respectively. At this time, the data acquisition circuit 15 overwrites the image band data and the attribute band data on the band #0 in the band memories 3e1 and 3f1, respectively, with the image band data and the attribute band data on the band #2. The data processing times for one band data at the JPEG codec 17 and the SRLE codec 18 are set to be shorter than the data processing time for one band data at the data acquisition circuit 15. The JPEG codec 17 and the SRLE codec 18 have already completed the processing for the band #0 by the time the data acquisition circuit 15 is ready to write, which prevents any problems caused by the data overwriting.

The band data on a band #2 and subsequent bands are processed in the same manner. Accordingly, the band data corresponding to one page are sequentially subjected to pipeline processing by the data acquisition circuit 15, the JPEG codec 17, and the SRLE codec 18, and the processed data is stored to the HDD 4.

Then, after the band data corresponding to one page is stored to the HDD 4, the respective band data are sequentially supplied to the image processing circuit 16. For example, when the image processing circuit 16 performs a complicated data processing, it cannot be sure that the data processing time for one band data at the image processing circuit 16 is shorter than the data processing time for one band data at the data acquisition circuit 15. Therefore, the page mode is set for complicated data processing jobs (for example, single-sided enlargement copying, single-sided mixed size copying, box storing, image 90-degree or 270-degree rotation copying/network transmission/facsimile transmission, as shown in FIG. 3). Then, in the page mode, in matching with a processing speed of the image processing circuit 16, the band data is supplied from the HDD 4 to the image processing circuit 16 by the HDD controller 14, the JPEG codec 17, and the SRLE codec 18.

Therefore, by the control of the data flow controller 12, the input DMAC 17r of the JPEG codec 17 reads the compressed image band data on the band #0 from the HDD 4 by the HDD controller 14. After the data decompression, the output DMAC 17w writes the image band data on the band #0 to the band memory 3e1. The input DMAC 18r of the SRLE codec 18 reads the compressed attribute band data on the band #0 from the HDD 4 by the HDD controller 14. After the data decompression, the output DMAC 18w writes the attribute band data on the band #0 to the band memory 3f1.

Subsequently, by an interrupt or the like, the image processing circuit 16 is notified by the data flow controller 12 that the writing of the image band data and the attribute band data on the band #0 by the JPEG codec 17 and the SRLE codec 18, respectively, has been completed. The input DMAC 16r of the image processing circuit 16 reads the image band data and the attribute band data on the band #0 from the band memories 3e1 and 3f1, respectively. The output DMAC 16w writes the image band data and the attribute band data on the band #0 that the data processing has been performed to the band memories 3c1 and 3d1, respectively. At this time, the input DMAC 16r and the output DMAC 16w operate in parallel with each other. The processing performed downstream of the image processing circuit 16 is the same as that in the band mode, and hence description thereof is omitted.

Meanwhile, the writing of the image band data and the attribute band data on the band #0 by the JPEG codec 17 and the SRLE codec 18, respectively, is completed. After that, the input DMACs 17r and 18r read the compressed image band data and the compressed attribute band data, respectively, on the band #1 so that the band data are sequentially output to the band memories 3e1, 3e2, 3f1, and 3f2 at time intervals set by the data flow controller 12. After the data decompression, the output DMACs 17w and 18w write the image band data and the attribute band data on the band #1 to the band memories 3e2 and 3f2, respectively.

Subsequently, by an interrupt or the like, the image processing circuit 16 is notified via the data flow controller 12 that the writing of the image band data and the attribute band data on the band #1 by the JPEG codec 17 and the SRLE codec 18, respectively, has been completed. The input DMAC 16r of the image processing circuit 16 reads the image band data and the attribute band data on the band #1 from the band memories 3e2 and 3f2, respectively. The output DMAC 16w writes the image band data and the attribute band data on the band #1 (for which the data processing has been performed) to the band memories 3c2 and 3d2, respectively.

Meanwhile, the writing of the image band data and the attribute band data on the band #1 by the JPEG codec 17 and the SRLE codec 18, respectively, is completed. After that, the input DMACs 17r and 18r read the compressed image band data and the compressed attribute band data, respectively, on the band #2 so that the band data are sequentially output to the band memories 3e1, 3e2, 3f1, and 3f2 at time intervals set by the data flow controller 12. After the data decompression, the output DMACs 17w and 18w write the image band data and the attribute band data on the band #2 to the band memories 3e1 and 3f1, respectively. At this time, the output DMACs 17w and 18w overwrite the image band data and the attribute band data on the band #0 in the band memories 3e1 and 3f1, respectively, with the image band data and the attribute band data on the band #2.

The band data on the band #2 and the subsequent bands are processed in the same manner. Accordingly, the band data corresponding to one page are sequentially subjected to pipeline processing by the JPEG codec 17, the SRLE codec 18, the image processing circuit 16, the JPEG codec 17, and the SRLE codec 18 in the stated order. The processed data is stored to the HDD 4. Note that the processing times for one band data at the JPEG codec 17 and the SRLE codec 18 are set to be equal to or shorter than half the processing time for one band data at the image processing circuit 16.

Next, after the data corresponding to one page has been processed and stored to the HDD 4, as was the case in the band mode, the processing for the outputting is performed, and then one of the printing, the network transmission, and the facsimile transmission is performed.

Next, description is made of an operation of the data processing device 1 in a case where a double-sided scanning job is designated. For example, the mode specification table 7a is the one illustrated in FIG. 3. When the job is double-sided copying, double-sided network transmission, or double-sided facsimile transmission, then double-sided scanning is performed by the scanner 5.

The image processing circuit 16 cannot simultaneously process a plurality of sets of the image data and the attribute data. Therefore, in processing such a job, the data flow controller 12 causes one of a front surface data obtained by reading a front surface image of an original and a back surface data obtained by reading a back surface image of the original to be processed in the band mode, and causes the other one thereof to be processed in the page mode. The front surface data is preferably processed in the band mode, while the back surface data is preferably processed in the page mode.

Figure 7:
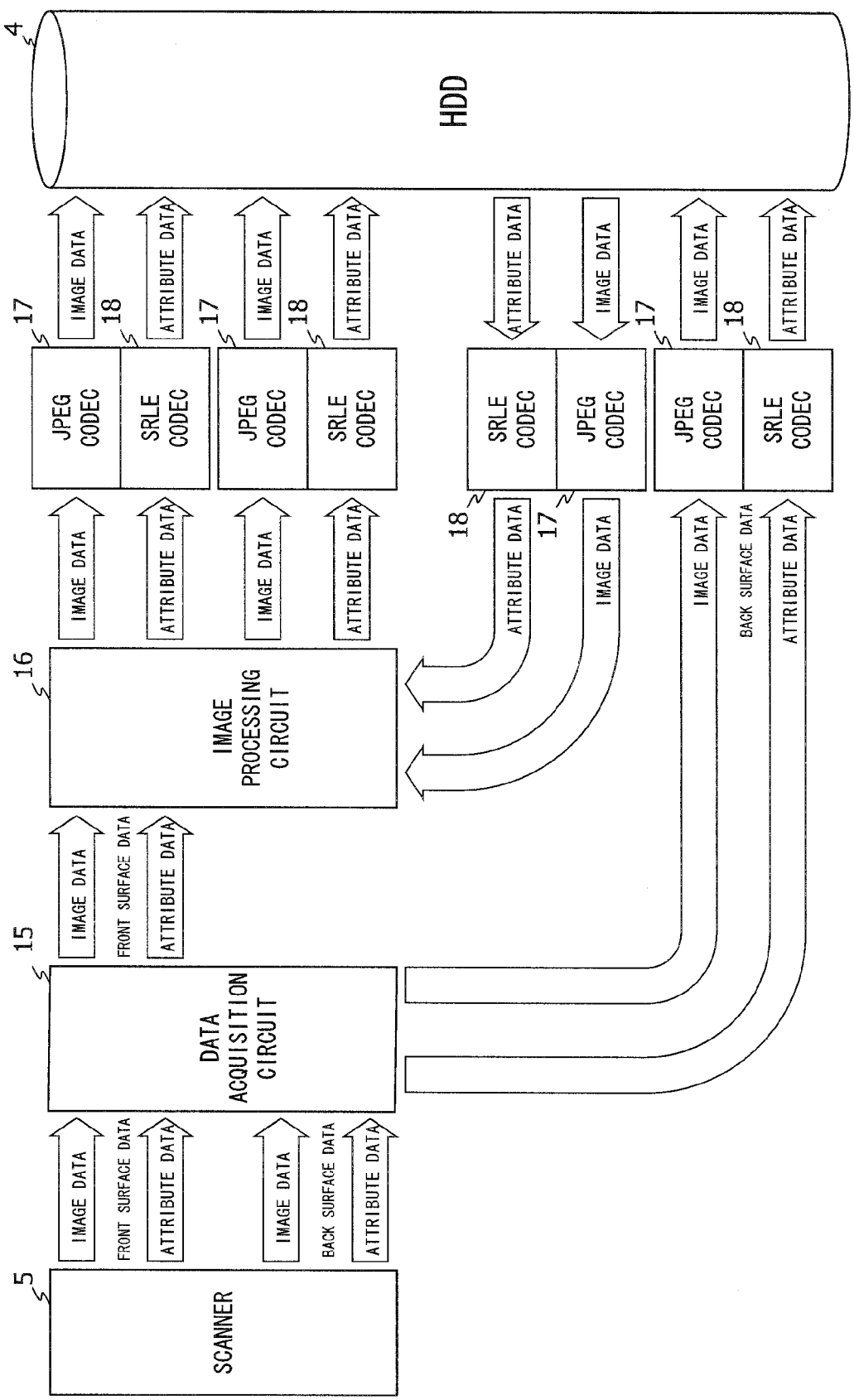
FIG. 7 is a diagram illustrating a data flow of processing of a job including double-sided scanning that is performed on the image processing apparatus illustrated in FIG. 1.

FIG. 7 is a diagram illustrating a data flow of processing a double-sided scanning job on the image processing apparatus illustrated in FIG. 1.

The data acquisition circuit 15 acquires the front surface data by reading the front surface image of the original and the back surface data by reading the back surface image of the original from the scanner 5. The front surface data includes the image data and the attribute data. The back surface data also includes the image data and the attribute data.

The front surface data is processed in the band mode, and is transferred from the output DMAC 15w1 of the data acquisition circuit 15 to the input DMAC 16r of the image processing circuit 16 through the band memories 3a1, 3a2, 3b1, and 3b2. Then, the front surface data is processed by the image processing circuit 16, and is stored in the HDD 4 after having been compressed by the JPEG codec 17 and the SRLE codec 18.

The back surface data is processed in the page mode, and is transferred from the output DMAC 15w2 of the data acquisition circuit 15 to the input DMACs 17r and 18r of the JPEG codec 17 and the SRLE codec 18, respectively, through the band memories 3e1, 3e2, 3f1, and 3f2. Then, the back surface data is stored in the HDD 4 after having been compressed by the JPEG codec 17 and the SRLE codec 18.

Then, after the processing for the front surface data in the band mode is completed, the back surface data is read from the HDD 4 and decompressed by the JPEG codec 17 and the SRLE codec 18. Then, the back surface data is transferred from the output DMAC 17w of the JPEG codec 17 and the output DMAC 18w of the SRLE codec 18 to the input DMAC 16r of the image processing circuit 16 through the band memories 3e1, 3e2, 3f1, and 3f2. The back surface data is processed by the image processing circuit 16, and is stored to the HDD 4 after having been compressed by the JPEG codec 17 and the SRLE codec 18.

After the data corresponding to one front-surface page for which data processing has been performed is stored to the HDD 4, output processing is performed, and printing, network transmission, or facsimile transmission is performed. Further, after the data corresponding to one back-surface page for which data processing has been performed is stored to the HDD 4, output processing is performed, and printing, network transmission, or facsimile transmission is performed.

According to the above-described embodiment, the storage device 7 stores the mode specification table 7a including the mode specification information obtained by associating the job designated by the user with the mode that indicates which of the page mode and the band mode is to be selected when the designated job is performed. Further, the operation panel 10 detects the first user operation for inputting the job and the second user operation for starting the job. Then, the main controller 2 uses the mode specification information to specify the mode corresponding to the job designated by the first user operation. And, when the second user operation is detected, the main controller 2 causes the data acquisition circuit 15 to acquire the image data and causes the image processing circuit 16 to perform the data processing by the specified mode.

Accordingly, immediately after the image data is acquired into the image processing apparatus by the data acquisition circuit 15, the data processing on the image data is started in the page mode or in the band mode irrespective of its data size. That is, in the band mode, the data processing may be started immediately after the image data corresponding to one band is acquired. Even in the page mode, the data processing may be started immediately after the image data corresponding to one page is acquired.

Further, according to the above-described embodiment, the image processing circuit 16, the JPEG codec 17, and the SRLE codec 18 each include an input DMAC that performs direct memory access for reading data from the two band memories and an output DMAC that performs direct memory access for writing data to the two band memories.

Then, the data flow controller 12 controls the input DMAC and the output DMAC of each of the image processing circuit 16, the JPEG codec 17, and the SRLE codec 18 to cause the output DMAC 16w of the image processing circuit 16 to write the image band data to one of the band memories 3c1 and 3c2. In parallel therewith, the data flow controller 12 causes the input DMAC 17r of the JPEG codec 17 to read the immediately preceding image band data from the other one of the band memories 3c1 and 3c2. Then, the data flow controller 12 causes the output DMAC 16w of the image processing circuit 16 to write the attribute band data to one of the band memories 3d1 and 3d2. In parallel therewith, the data flow controller 12 causes the input DMAC 18r of the SRLE codec 18 to read the immediately preceding attribute band data from the other one of the band memories 3d1 and 3d2.

Accordingly, when the output DMAC 16w of the image processing circuit 16 performs the writing of the band data, the input DMACs 17r and 18r of the JPEG codec 17 or the SRLE codec 18 performs the reading of the band data. The writing and the reading of the band data are performed in parallel with each other, to thereby reduce the time required for the writing and the reading of the band data to/from the memory. In particular, in the above-described embodiment, all of the processing circuits disposed in a processing route from the scanner 5 to the HDD 4 perform the processings as described above, with the result that the processings are performed at high speed without any delay by waiting for data.

The present invention includes various other embodiments. For example, other designs can be used in which the above-described components are each performed.

In the above-described embodiment, in the case where the image has the four planes in CMYK and the attribute data has the A-plane and the S-plane, the three planes in CMY may be handled as the image data, while the K-plane, the A-plane, and the S-plane may be handled as the attribute data.

Further, in the above-described embodiment, the RAM 3 may be configured to include separate RAM modules corresponds to the pairs of two band memories (3a1 and 3a2), (3b1 and 3b2), (3c1 and 3c2), (3d1 and 3d2), (3e1 and 3e2), and (3f1 and 3f2), and cause the respective RAM modules to be accessed in parallel with each other. Alternatively, the RAM 3 may be configured to include separate RAM modules of the same number as that of the band memories and cause the respective RAM modules to be accessed in parallel with one another.

Further, in the above-described embodiment, in a case of a job including image 90-degree or 270-degree rotation processing, the image data and the attribute data corresponding to one page is processed by the image processing circuit 16 and stored in the HDD 4. Then, the JPEG codec 17 and the SRLE codec 18 read the compressed band data necessary for the image 90-degree or 270-degree rotation processing to be performed by the image rotation circuit 19, from the HDD 4 by the HDD controller 14. The JPEG codec 17 and the SRLE codec 18 decompress the compressed band data and store the band data in the RAM 3. Then, the image rotation circuit 19 performs the image 90-degree or 270-degree rotation processing by using the band data obtained by being decompressed by the JPEG codec 17 and the SRLE codec 18.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image processing apparatus, comprising:
a storage device configured to store mode specification information associating a job with a mode, wherein the mode specification information indicates which of a page mode and a band mode is to be selected when the job is performed;
a data processing device configured to acquire image data and perform a data processing on the image data;
an input device configured to detect a first user operation for inputting the job and a second user operation for starting the job;
a main controller configured to (1) specify the mode corresponding to the job designated by the first user operation, and (2) cause the data processing device to acquire the image data upon detection of the second user operation and to perform the data processing according to the specified mode;
a data storage device configured to store the image data corresponding to one page;
a memory configured to store band data obtained by dividing the image data corresponding to one page, wherein the image data is stored in the memory as the band data when the specified mode is the band mode, and wherein the image data is stored in the data storage device when the specified mode is the page mode;
the data processing device is further configured to perform the data processing on the band data read from the memory when the specified mode is the band mode, and wherein the data processing device is further configured to perform the data processing on the image data read from the data storage device when the specified mode is the page mode; and
a scanner configured to output the band data of the image data and the band data of attribute data corresponding to the image data, wherein the data processing device comprises a data compression/decompression circuit; and when the specified mode is the page mode, the data compression/decompression circuit is configured to read from the memory the band data of the image data and the band data of the attribute data corresponding to the image data, compress the band data of the image data and the band data of the attribute data corresponding to the image data, store the band data of the image data and the band data of the attribute data corresponding to the image data that have been compressed into the data storage device, read the band data of the image data and the band data of the attribute data corresponding to the image data that have been compressed from the data storage device, decompress the band data of the image data and the band data of the attribute data corresponding to the image data that have been compressed, and store into the memory the band data of the image data and the band data of the attribute data corresponding to the image data.

2. The image processing apparatus according to claim 1, wherein:
the data processing device comprises a data compression/decompression circuit; and
the data compression/decompression circuit is configured to read, when the specified mode is the page mode, the band data from the memory, compress the band data, store the compressed band data into the data storage device, read the compressed band data from the data storage device, decompress the compressed band data, and store the band data into the memory.

3. The image processing apparatus according to claim 1, wherein:
the data compression/decompression circuit comprises:
a joint photographic experts group (JPEG) codec; and
a switched run length encoding (SRLE) codec;
the JPEG codec is configured to compress/decompress the band data of the image data; and
the SRLE codec is configured to compress/decompress the band data of the attribute data.

4. The image processing apparatus according to claim 1, wherein:
when the specified mode is the page mode, the data compression/decompression circuit is configured to read from the data storage device compressed band data necessary for the data processing to be performed by the data processing device after the band data corresponding to one page is stored into the data storage device, decompress the compressed band data, and store the band data into the memory; and
the data processing device is further configured to perform the data processing on the band data decompressed by the data compression/decompression circuit.

5. The image processing apparatus according to claim 1, wherein:
the data processing device comprises:
a plurality of processing circuits; and
a data flow controller;
the memory comprises:
a first band memory; and
a second band memory;
each of the plurality of processing circuits comprises an output direct memory access controller (output DMAC) that performs direct memory access for writing the band data to the first band memory and the second band memory and an input direct memory access controller (input DMAC) that performs direct memory access for reading the band data from the first band memory and the second band memory; and
the data flow controller is configured to cause the output DMAC to alternately write the band data to one of the first band memory and the second band memory, and when the specified mode is the band mode, in parallel therewith, cause the input DMAC to read the band data that immediately precedes the band data from another one of the first band memory and the second band memory.

6. The image processing apparatus according to claim 5, wherein, when the specified mode is the band mode, the data flow controller is further configured to initiate, when the writing of the band data to the first band memory is completed, the reading of the band data from the first band memory and the writing of subsequent band data to the second band memory, and to initiate, when the writing of the subsequent band data to the second band memory is completed, the reading of the subsequent band data from the second band memory and the writing of further subsequent band data to the first band memory.

7. The image processing apparatus according to claim 5, wherein a respective data processing time for one band data for each of the plurality of processing circuits is set to be shorter than the data processing time of the processing circuit at its preceding stage.

8. The image processing apparatus according to claim 1, wherein the page mode is specified when the job includes single-sided enlargement copying, single-sided mixed size copying, box storing, or image 90-degree or 270-degree rotation copying/network transmission/facsimile transmission.

9. The image processing apparatus according to claim 1, wherein the band mode is specified when the job includes single-sided copying, single-sided reduction copying, single-sided 180-degree rotation copying, or single-sided network transmission/facsimile transmission.

10. The image processing apparatus according to claim 1, wherein:
the data processing device further comprises an image rotation circuit configured to perform image 90-degree or 270-degree rotation processing that generates image data corresponding to one page rotated by one of 90 or 270 degrees;
the specified mode corresponding to the job including the image 90-degree or 270-degree rotation processing is set to the page mode;
the data compression/decompression circuit is configured to read the compressed band data necessary for the image 90-degree or 270-degree rotation processing from the data storage device after the band data corresponding to one page is stored into the data storage device, decompress the compressed band data, and store the band data into the memory; and
the image rotation circuit is further configured to perform the image 90-degree or 270-degree rotation processing of the band data as decompressed by the data compression/decompression circuit.

11. The image processing apparatus according to claim 1, further comprising a double-sided scanner configured to perform double-sided scanning, wherein:
the data processing device is further configured to acquire the image data of a front surface and the image data of a back surface obtained by the double-sided scanning, and perform the data processing on the image data of the front surface and on the image data of the back surface; and
the main controller is further configured to cause the data processing device to perform the data processing on one of the image data of the front surface and the image data of the back surface in the band mode, and to cause the data processing device to perform the data processing on another one of the image data of the front surface and the image data of the back surface in the page mode.

12. The image processing apparatus according to claim 11, wherein the specified mode corresponding to the job including the double-sided scanning is set to the band mode for the image data of the front surface and is set to the page mode for the image data of the back surface.

13. An image processing method, comprising:
detecting on an input device a first user operation for inputting a job;
detecting on the input device a second user operation for starting a job;
specifying a mode corresponding to the job designated by the first user operation;
storing mode specification information associating the job with a mode selected from a page mode and a band mode;
causing a data processing device to acquire image data upon detecting the second user operation;
performing the data processing according to the specified mode;
storing in a data storage device image data corresponding to one page; and
storing in a memory band data obtained by dividing the image data corresponding to one page, wherein the image data is stored in the memory as the band data when the specified mode is the band mode, and wherein the image data is stored in the data storage device when the specified mode is the page mode;

performing the data processing on the band data read from the memory when the specified mode is the band mode, and performing the data processing on the image data read from the data storage device when the specified mode is the page mode; and a scanner configured to output the band data of the image data and the band data of attribute data corresponding to the image data, wherein the data processing device comprises a data compression/decompression circuit; and when the specified mode is the page mode, the data compression/decompression circuit is configured to read from the memory the band data of the image data and the band data of the attribute data corresponding to the image data, compress the band data of the image data and the band data of the attribute data corresponding to the image data, store the band data of the image data and the band data of the attribute data corresponding to the image data that have been compressed into the data storage device, read the band data of the image data and the band data of the attribute data corresponding to the image data that have been compressed from the data storage device, decompress the band data of the image data and the band data of the attribute data corresponding to the image data that have been compressed, and store into the memory the band data of the image data and the band data of the attribute data corresponding to the image data.

14. The image processing method according to claim 13, wherein the data processing device comprises a data compression/decompression circuit that is configured to read, when the specified mode is the page mode, the band data from the memory, compress the band data, store the compressed band data into the data storage device, read the compressed band data from the data storage device, decompress the compressed band data, and store the band data into the memory.

* * * * *